United States Patent [19]

Moss

[11] Patent Number: 4,531,571
[45] Date of Patent: Jul. 30, 1985

[54] CONDENSER TARGETED CHLORINATION INJECTION SYSTEM

[75] Inventor: Robert D. Moss, Chattanooga, Tenn.

[73] Assignee: Tennessee Valley Authority, Muscle Shoals, Ala.

[21] Appl. No.: 603,045

[22] Filed: Apr. 23, 1984

[51] Int. Cl.³ .............................. F28G 1/00; F28G 1/16; F28G 9/00
[52] U.S. Cl. ........................................ 165/1; 165/95; 137/896; 366/276; 210/754; 210/198.1
[58] Field of Search ....................... 165/1, 95; 137/896; 366/167, 276, 278; 210/754, 198.1; 134/6

[56] References Cited

U.S. PATENT DOCUMENTS

| | | | |
|---|---|---|---|
| 1,659,459 | 2/1928 | Clarke | 165/95 |
| 1,983,109 | 12/1934 | Warren et al. | 165/95 |
| 3,045,978 | 7/1962 | Waldhofer | 165/95 |
| 3,123,132 | 3/1964 | Hedgecock | 165/95 |
| 4,260,587 | 4/1981 | Braden | 210/198.1 |
| 4,333,833 | 6/1982 | Longley et al. | 210/754 |

FOREIGN PATENT DOCUMENTS 164838 6/1921 United Kingdom ................ 165/95

Primary Examiner—William R. Cline
Assistant Examiner—John K. Ford
Attorney, Agent, or Firm—Robert A. Petrusek

[57] ABSTRACT

Herein is described a method for feeding chlorine to a heat exchanger (condenser) for biological fouling control by targeting the feed to only a few tubes at a time. The assembly comprises a manifold surrounded by a seal which directly contacts the condenser tube sheet, thereby feeding chlorine to only a few selected condenser tubes at a time and the seal serves to restrict the flow of water through the tubes, thereby increasing the contact time between the chlorinated water and the fouling mass in the tubes. The manifold, powered by a pneumatic/hydraulic drive, moves across the entire condenser tube sheet so that all tubes are chlorinated for the same duration. A principal advantage of this system is that it allows the feed of relatively high concentrations of chlorine to the selected tubes, but is designed to meet EPA effluent limitations without dechlorination.

5 Claims, 6 Drawing Figures

CONDENSER TARGETED CHLORINATION INJECTION SYSTEM

The invention herein described may be manufactured and used by or for the Government for governmental purposes without the payment to us of any royalty therefor.

BACKGROUND OF THE INVENTION

In the generation of electricity, a boiler produces steam at sufficient pressure and temperature to do work on (turn) a turbine. When the turbine shaft is turned, a generator is also turned and thereby produces electricity. As the steam turns the turbine, the energy is exhausted at various stages of the turbine. For this steam to leave the turbine, it must overcome atmospheric pressure (14.7 $lb/in^2$). By installing a condenser at the outlet of the turbine, a vacuum is imparted on the turbine outlet. This means that the steam does not have to push against atmospheric pressure to leave the turbine. Therefore, less fuel will be used to get the same work done in the turbine.

The condenser accomplishes this feat by the process of condensing the steam around many small tubes through which cool water is flowing. This exchange of heat from the steam to the water condenses the steam to very pure water for reuse in the boiler. Since this condensing process reduces the steam volume on the order of 1/60 of what it was at the turbine outlet, a vacuum is formed. If the heat transfer from the steam to the cooling water is reduced, then additional fuel is required by the boiler to create enough energy to push the steam against the backpressure at the turbine outlet.

In once-through cooling systems, biological fouling of the condenser tubes is a major factor in reducing the required heat transfer. Of all the components of the steam generation cycle, condensers are the most frequent source of poor unit efficiency and poor unit availability. Therefore, condensers must be cleaned at various intervals which incurs significant costs for cleaning and costs of replacement power while that particular unit is offline. For a typical 600-MWe base loaded coal-fired unit, a manual condenser cleaning can cost $3,200 plus as much as $100,000 in replacement power.

Chemical oxidants, especially chlorine, have proven effective in controlling microfouling in the condenser tubes and are widely used by utilities. Existing Federal regulations have restricted the application of chlorine for biofouling control to minimize free residual chlorine (FRC) in cooling water discharges. Recently, concern over toxicity from FRC or its reaction products has resulted in proposed Federal regulations further restricting chlorine levels in effluents. The existing limit of 0.2 mg/l allowable FRC will be reduced to 0.2 mg/l total residual chlorine (TRC) in cooling water discharges from stations with once-through and recirculating cooling systems. These environmental restrictions will result in a decrease in the effectiveness of chlorine as a biofouling control method—even to the point of making chlorination essentially useless for adequate fouling control.

The presently utilized method of chlorination is to inject chlorine upstream of the condenser to the entire cooling waterflow for a specified duration. The chlorinated water flows through the condenser and then out to the discharge canal. The point just prior to entering the discharge canal is the point source for meeting EPA chlorinated water effluent limitations. Therefore, this point of compliance is a limiting factor on the chlorine concentration in the condenser. In addition, chlorinating the entire cooling waterflow at once is a limiting factor on the amount of chlorine fed to each tube.

Therefore, a better technology must be developed so that biofouling can be controlled and heat rate maintained through the addition of chlorine, and yet meet the present and proposed effluent guidelines for chlorination. The present invention addresses the development of a novel condenser chlorination technique utilizing the injection of chlorine at relatively high concentrations targeted sequentially at groups of tubes or sections of the condenser tube sheet at a time via a manifold. In this manner, the high concentration of chlorine through a section of the condenser will be diluted at the condenser outlet by mixing with the nonchlorinated waterflow through the other sections, thus meeting effluent guidelines. The effectiveness of targeted, high concentration chlorine injection is further increased by reducing the flow in the targeted tube, thus increasing the chlorine contact time with the biofilm layer.

The cost-benefit of this chlorination method is conservatively projected to be approximately $250,000 per unit per year in fuel costs alone. Other factors to be added to the cost-benefit are in regard to costs of manual cleanings, costs of replacement power, and costs of installing and operating dechlorination equipment.

From an environmental point of view, this chlorination method will allow power plants to discharge no measurable residual chlorine to water systems. In addition, while the effective concentration of chlorine fed to the condenser tubes is much higher than past practice, the actual poundage of chlorine fed to the cooling water and then discharged to the environment will be cut by approximately 75 percent.

SUMMARY OF THE INVENTION

The present invention relates to the targeting of chlorinated water to a small number of tubes in an operating condenser so as to feed sufficient chlorine to control biological fouling growths in the condenser tubes. Since only a small number of tubes (approximately 300) are chlorinated at one time relative to the total number of condenser tubes (approximately 11,500), the normal cooling waterflow through the rest of the tubes will dilute the chlorinated water in the condenser outlet water box and in the discharge pipe such that EPA effluent guidelines of 0.2 mg/l total residual chlorine (TRC) will be met at the end of the discharge pipe.

Instead of chlorine being fed to the entire cooling waterflow at the plant intake, a concentrated chlorine solution is piped into the plant and directly to the condenser where it flows through a shaft into the condenser inlet water box and then into the manifold which is located in front of the tube sheet. From this manifold, the chlorine is targeted to specific condenser tubes. At the exit of the tubes, the chlorinated water mixes with the unchlorinated water thereby diluting the chlorine solution to environmentally acceptable levels.

The manifold is a pipe that has been divided along its length and a metal plate has been installed along the diameter of the pipe. Holes are punched into the metal plate at specific points so that the flux across the manifold is equal. In that way each tube is fed the same amount of chlorinated water.

The seal is made of premolded neoprene. The seal surrounds the area of the manifold plate from which chlorinated water is fed to the condenser tubes. It is strong enough to withstand the force of a 12-foot pressure drop, and it is strong enough to break up any debris that would get in the way. The seal is designed to make a flush contact with the tube sheet to ensure adequate targeting and flow reduction.

Most condensers are built in two halves so that a unit can be derated and one side serviced at a time without shutting off the entire unit. Due to this design feature, a separate manifold system will be required for each side. In addition, the tube bundle in the condenser is, generally, of two basic diagrams—rectangular or circular. This invention is adaptable to each type of design—only the shape and drive of the manifold must be altered. Since the circular tube sheet requires the most sophisticated design and since many of the condensers used by TVA and other electric utilities contain circular tube sheets the designs comprising the present invention are particular for a circular tube sheet.

To treat a circular tube sheet, the manifold will require a special design and a special drive mechanism. To treat the circular tube sheet, the manifold will perform as a windshield wiper, i.e., one side of the manifold will be anchored next to the divider wall in the inlet water box at the center point of the 180° arc exhibited by the tube sheet. From this origin, the manifold will be moved slowly across the 180° arc and then returned to its resting position.

As explained above, the manifold is a pipe divided lengthwise with a flat plate welded to the now flat end of the pipe, and attached to the edge of the plate is the seal. By moving in a circular pattern, it is obvious that the condenser tubes closer to the origin will receive more chlorination than those tubes further from the origin point. Therefore, the seal will be molded in a pie shape such that the tubes on the outside of the arc will receive the same length of chlorination as the tubes closest to the origin point. The angular velocity of the manifold will, therefore, allow a 3-minute residence time of chlorination for each tube.

OBJECTS OF THE INVENTION

It is therefore a general object of the instant invention to target a relatively high concentration of flow-restricted chlorinated water to a few condenser tubes at a time so as to provide adequate chlorination for biological fouling control in the water side of the condenser, and to allow dilution of the chlorinated water by the unchlorinated water such that EPA effluent limitation guidelines are met.

It is a more specific object of the present invention to provide a means of chlorinating only a few condenser tubes at a time, i.e., target certain tubes to be chlorinated for a specific duration.

It is a further object of the present invention to allow dilution of the small chlorinated water volume by the total flow through the untargeted tubes in the condenser.

It is an additional object of the instant invention to provide a system of the foregoing type by employing a manifold to be installed in the condenser inlet water box juxtaposed the tube sheet through which relatively high concentrations of chlorinated waterflows for targeted feed to the tubes covered by the manifold.

It is another object of the herein described invention to provide a manifold of the foregoing type which will be encircled (on the edge of the manifold) by a seal that will be pressed against the tube sheet such that water-flow around the seal is almost zero; such that better targeting of the condenser tubes is achieved and that the total flow of chlorinated water through the targeted tubes is of a lower velocity than normally experienced to thereby allow for more contact time between the chlorinated water and the fouling mass in the tubes.

It is a further object of the invention taught herein to provide a system of the foregoing type such that the shape of the manifold and seal is such that each targeted tube is chlorinated for the same duration.

It is still another object of the present invention to provide a system of the foregoing type such that the manifold will be slowly moved across the entire tube sheet during a normal chlorination period. For a circular tube sheet, the manifold will move in like manner as a windshield wiper, pivoting from the center point of the tube sheet circle, the arm moving from a downward, vertical position to the upward, vertical position, and then back to the starting point.

It is an additional object of the instant invention to provide a drive mechanism for the foregoing system for the purpose of slowly moving the manifold across the condenser tube sheet with sufficient torque so as not to be affected by waterflow pressures in the condenser or by debris (sticks, shells, weeds, etc.) lodged in the condenser tubes.

Other objects and advantages of the present invention will become apparent from the following description taken in conjunction with the appended drawings in which:

DETAILED DESCRIPTION OF THE DRAWINGS IN CONJUNCTION WITH THE PREFERRED EMBODIMENTS

In general, the present invention concerns the utilization of a targeted feed system for chlorine application to a heat exchanger for biological fouling control. As will be described infra, by only chlorinating a small portion of the condenser tubes at a particular time, higher chlorine concentrations than normal may be employed, and the dilution of those chlorine concentrations by the unchlorinated cooling will allow compliance with EPA NPDES permit requirements. Also, flow reduction during chlorination of the tubes, as accomplished by the use of a manifold surrounded by a seal, will allow more contact between the chlorine and the fouling mass in the tubes. All drawings are those of a targeted chlorination feed system for application in a condenser with a circular tube arrangement.

Figure 1:
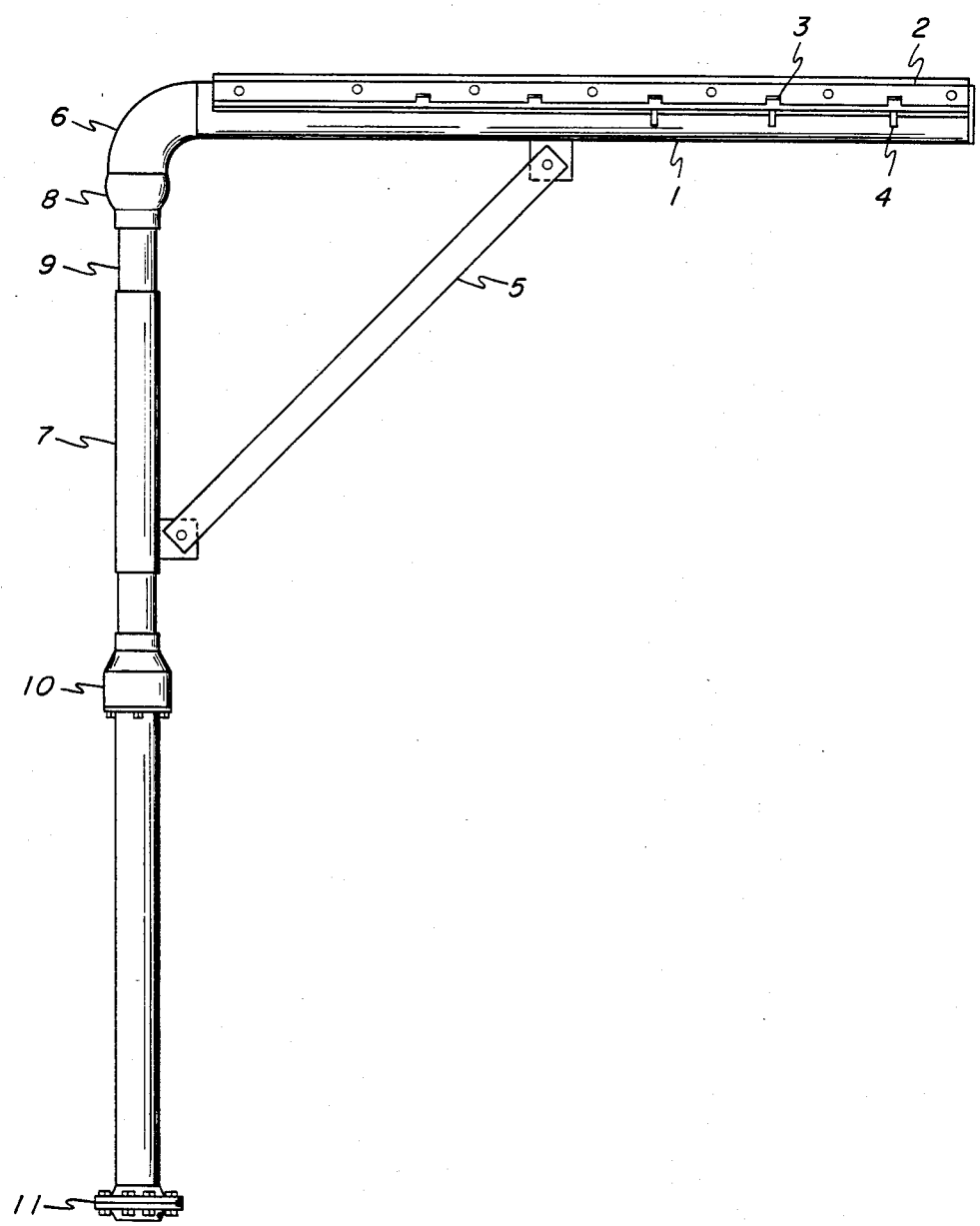
FIGS. 1-4 illustrate different embodiments of the manifold of the present invention.

Referring now more specifically to FIG. 1, targeted chlorination manifold 1 is 6 inches in diameter and is designed to be long enough to cover all condenser tubes from the separation wall between the condenser inlet water boxes and the outside tubes. At the test site, this length is 7 feet 1 inch. Manifold 1 is constructed of schedule XX carbon steel piping and will be able to withstand the pressures in the condenser and will not be corroded by the chlorinated water solution. In this particular embodiment, seal 2 is constructed of molded neoprene, is $\frac{3}{4}$ inch wide, and is designed to allow contact with the condenser tube sheet such that the distribution plate of manifold 1 is two inches from the tube sheet. Seal 2 is adjustable by means of slots 3 in manifold 1 to ensure a snug fit of manifold 1 against the tube sheet. Gussets 4 are installed toward the end of manifold 1 to provide added support for seal 2. Seal 2 will reduce the normal tube velocity from 6.8 fps to approximately 1.5 fps.

Manifold drive shaft 7 is 4 inches in diameter, is schedule XX strong carbon steel, and is hollow so that the chlorinated water can be pumped through it into manifold 1. Support bar 5 is installed between drive shaft 7 and manifold 1 to provide additional rigidity of the targeted system against the hydraulic forces in the condenser. A 90° ell 6 connects to manifold 1 and is also connected to 6-inch by 4-inch reducer 8 to accommodate 4-inch drive shaft 7. The primary reasons for using a 4-inch drive shaft rather than a 6-inch drive shaft is because the condenser face plate seal 11 will accommodate a 4-inch shaft better than a 7-inch shaft. Drive shaft 7 is turned down at position 9 to accommodate pillow block support bearings. Drive shaft coupling 10 with positive clutch is used to provide easy installation of the system in the condenser inlet water box, and it will also allow easy maintenance of shaft 7 and manifold 1 during operation thereof.

Figure 2:
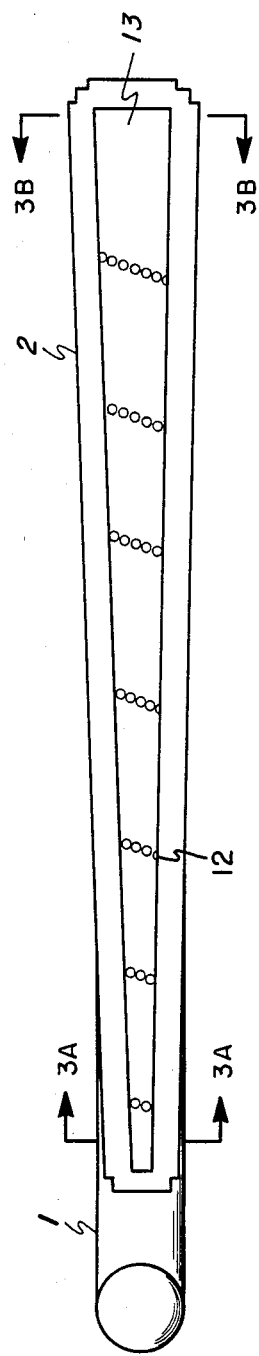

Referring now more specifically to FIG. 2, manifold 1 is shown from the perspective of the area facing the tube sheet. Seal 2 is shown and displays the means whereby all tubes covered by manifold 1 will be chlorinated for the same duration. The width of seal 2 opening is 2 1/8 inches on the left side as shown, which is the area closest to the center point of the arc created by the movement of manifold 1 in a circular motion. Seal 2 has a 6° angle to result in a 6-inch opening thereof at the right side of the manifold as shown. Flat distribution plate 13 is shown. The 1/4-inch diameter holes 12 in manifold distribution plate 13 are drilled at various positions and diameters to ensure an equal flux of chlorinated waterflow across manifold 1.

Figure 3B:
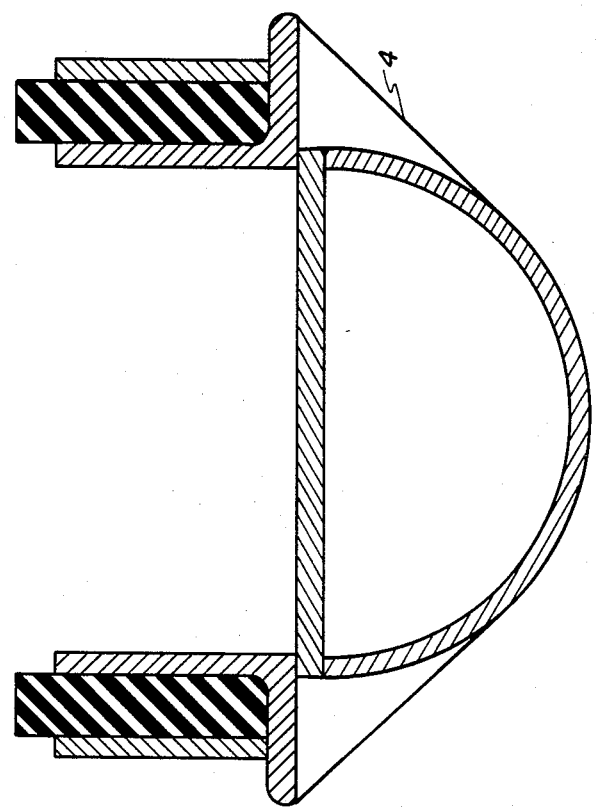
Figure 3A:
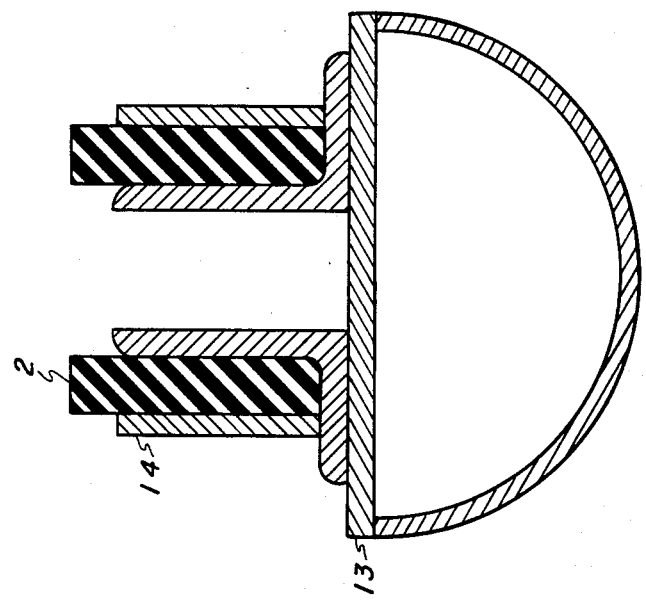

Referring now more specifically to FIGS. 3A and 3B, there is shown a side view of the two ends of the manifold as shown in FIG. 2, supra. FIG. 3A shows a section of the left side of manifold 1, as depicted in FIG. 2. Seal 2, distribution plate 13, and seal supports 14 are shown. FIG. 3B depicts a section of the right side of manifold 1, as shown in FIG. 2. Seal 2, distribution plate 13, seal supports 14, and support gussets 4 are shown.

Figure 4:
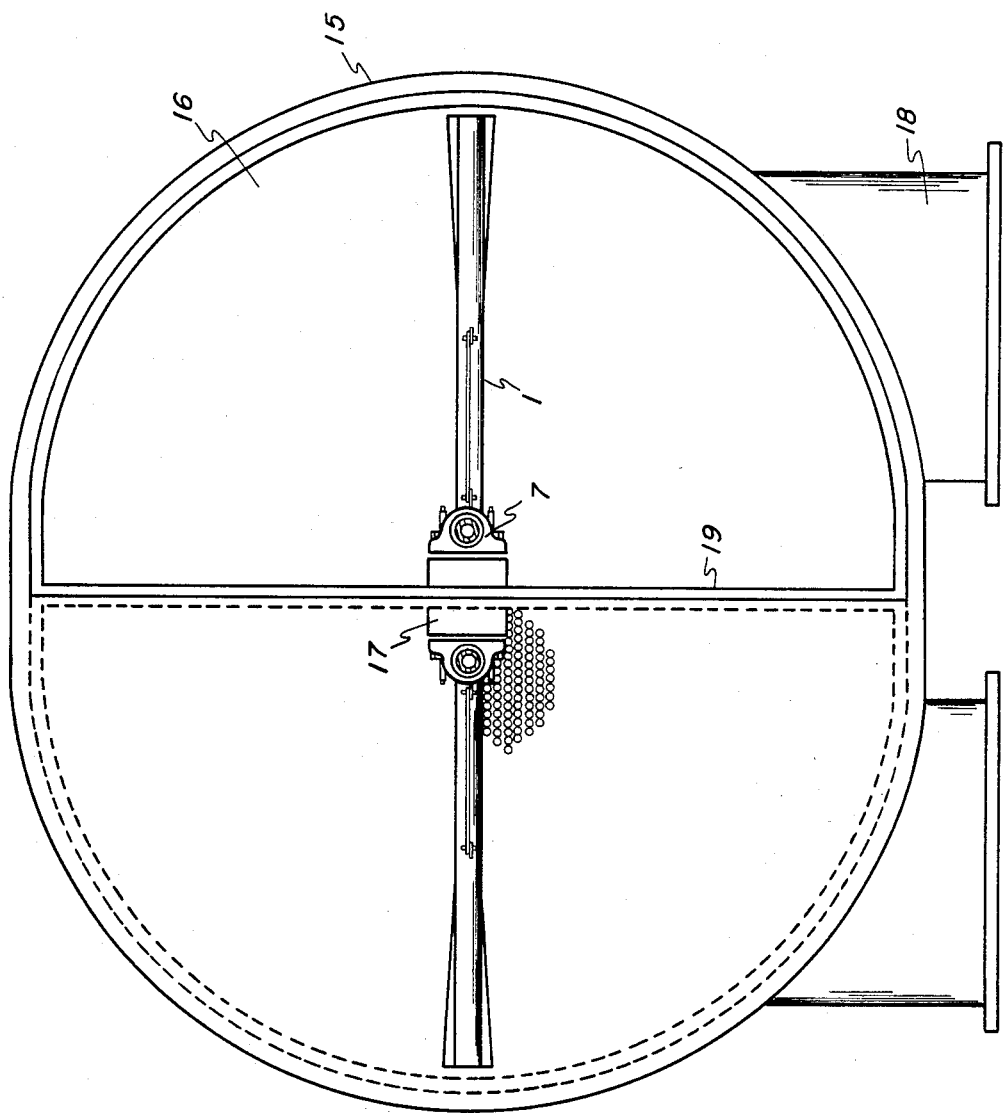

Referring now more specifically to FIG. 4, it shows the position of manifold 1 in both inlet water boxes 15 from a frontal perspective. The center point for the arc traveled by manifold 1 about drive shaft 7 is shown. Drive shaft 7 for such a water box configuration is located near dividing plate 19 between water boxes 15. Condenser tube sheet 16, inlet water pipes 18, and pillow block bearings 17 are also shown.

Figure 5:
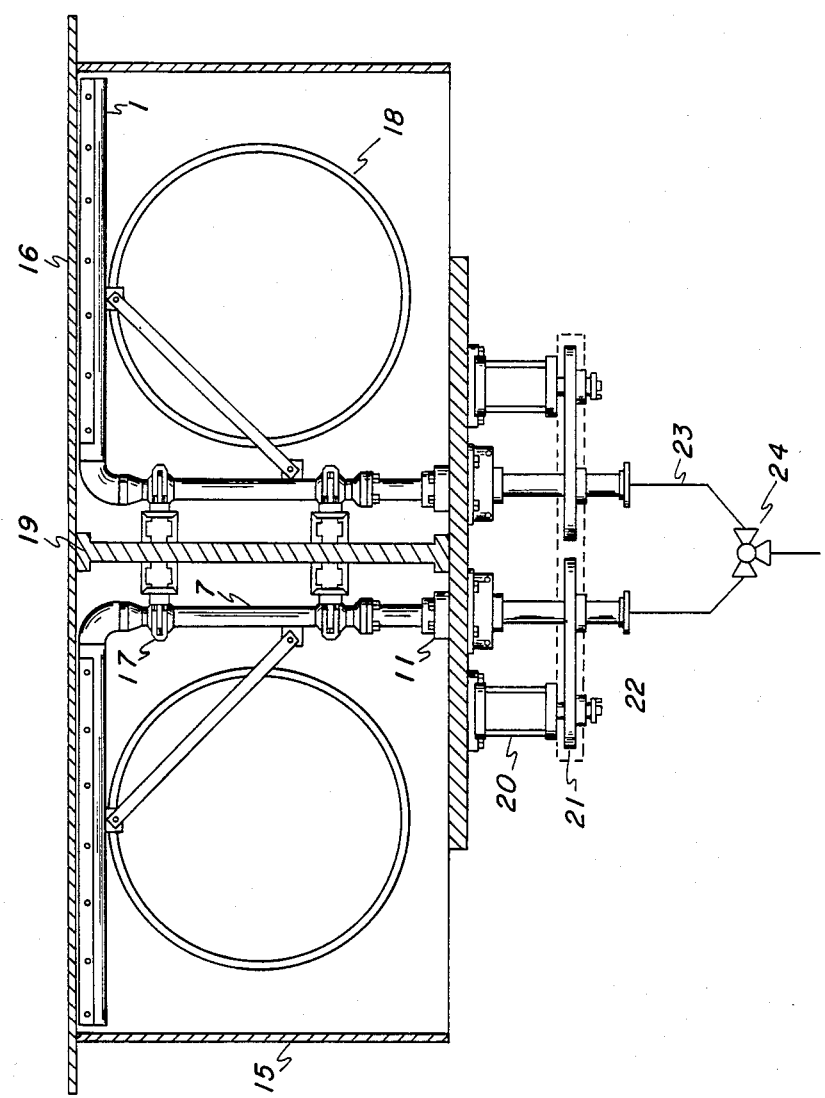
FIG. 5 illustrates different embodiments of the drive mechanism of the present invention.

Referring now more specifically to FIG. 5, therein is shown an overhead view of the manifold and drive system as installed in the condenser inlet water box. Those items specifically displayed are manifold 1, drive shaft 7, condenser face plate seal 11, water box dividing wall 19, pillow block bearings 17, inlet water box 15, condenser tube sheet 16, and inlet water pipes 18. Also displayed is the external drive system. This system includes a pneumatic/hydraulic driven actuator 20 which turns 16-inch spur gear 21, connected to 24-inch spur gear 22 that is connected to drive shaft 7. This drive system will supply sufficient torque (132,000 inch-pounds) to move each manifold 1 in a 180° arc across condenser tube sheet 16 in 2 hours without being stopped by any debris stuck in the ends of the condenser tubes. Chlorine feed line 23 and the 3-way valve 24 are also displayed in order to show that each side of the condenser is chlorinated by itself and that the chlorinated water flows into the drive shaft external to the condenser water box and flows through the hollow drive shaft into manifold 1 at tube sheet 16.

It should be understood that the manifold system with a seal as described above can be modified slightly to target chlorine feed to different shapes of tube sheets, not just circular tube sheets, by different types of drive mechanisms, and by small changes in the seal configuration. For example, the angled seal can be made rectangular and a horizontal or vertical drive mechanism will allow targeting of chlorine to rectangular tube sheets. The main objects of the invention will apply to most systems and they are: (1) manifold design, (2) a seal around the manifold to reduce flow and assist targeting, and (3) dilution of the relatively highly concentrated chlorinated water by the rest of the cooling waterflow in the condenser. By means of the present invention, a utility will be able to add sufficient chlorine to a condenser to control biological fouling and still meet EPA effluent guidelines.

In order that those skilled in the art may better understand how the present invention can be practiced, the following example is given by way of illustration and not necessarily by way of limitation.

EXAMPLE

The prototype cooling system includes a single-pass, divided-water box type surface condenser with two separate inlet and outlet connections. Each half of the condenser contains 5,871 tubes, which typically measure 0.875-inch od and 0.795-inch id. Normal cooling waterflow rate through the condenser is 270 ft$^3$/s (135 ft$^3$/s through each side), and the normal tube velocity is about 6.8 ft/s. The inlet and outlet water boxes are semicircular in shape with a radius of 8 feet 1 inch and a depth of 6 feet 8 inches from the water box end wall to the tube sheet face.

In any physical model study, the choice of a scaling criterion for relating model results to prototype conditions is determined by the relative magnitude of forces which control the phenomena under consideration. For these studies, the seal tests were conducted using prototype geometry and materials. In the condenser model, Euler scaling was used for determining and interpreting flow patterns, velocities, and head losses. This scaling criterion is discussed in more detail in the following section.

Because of the complex geometry for the water boxes and the relatively abrupt changes in shape, the major internal losses within the water boxes come from the dissipation of energy in turbulence created by shape, rather than from viscous shear at flow boundaries. Friction losses due to viscous shear within the condenser tubes must also be properly scaled to provide the correct velocity distribution among tubes. The Euler number, E, indicates the relative importance of pressure and inertial forces. Equality of Euler numbers for model and prototype is necessary for proper flow similarity (Rouse, 1950).

The Euler number can be expressed as $$E = \frac{P}{1/2 \rho V^2} \quad (1)$$

where P is a characteristic differential pressure, $\rho$ is the fluid density, and V is a characteristic velocity: The Euler scaling criterion requires that $$E_m = E_p \quad (2)$$

The principal requirement for equality of Euler numbers is that viscous effects must be negligibly small compared to inertial effects. The Reynolds number, R, which represents the ratio of inertial to viscous forces, can be defined as $$R = VD/\nu \quad (3)$$

where D is a characteristic length and $\nu$ is the kinematic viscosity of the working fluid. Previous research indicates that viscous effects are often negligible, and the requirements of the Euler scaling criterion are satisfied, for Reynolds numbers larger than about $10^5$ (McNown, 1953; Patterson and Abrahamson, 1962; March and Nyguist, 1976).

Equations (1) and (2) can be combined and simplified into the expression $$\frac{\Delta P_m}{\Delta P_p} = \frac{\Delta H_m}{\Delta H_p} = \frac{V_m^2}{V_p^2} \quad (4)$$

where subscripts m and p refer to model and prototype, respectively. In equation (4), a head loss, $\Delta H$, has been substituted for the equivalent pressure change, $\Delta P$, because the specific weight of the fluids for model and prototype are essentially equal. Equation (4) can be rearranged to show that any model loss coefficient K should equal the corresponding prototype loss coefficient K:

$$K_m = \frac{2g\Delta H_m}{V_m^2} = \frac{2g\Delta H_p}{V_p^2} = K_p \quad (5)$$

where g is the acceleration of gravity.

Once a model design velocity has been chosen, any measured model loss can be scaled to the prototype. This implies, however, that any given model loss, such as friction loss due to shear within the condenser tubes, must be correctly reproduced relative to all other model losses.

The condenser water box model was designed to operate at prototype velocities. The model was constructed primarily from transparent acrylic plastic to a geometric scale ratio of 1:6. The model included a portion of the approach culvert, a single inlet riser with butterfly valve, an inlet water box, a simulated tube sheet and tube bundle, and an outlet water box. Only one side of the split condenser was modeled. The model condenser tubes were distributed according to the pattern of the prototype tube sheet with the same relative open area in model and prototype for all regions of the tube sheet. The number and size of the condenser tubes used in the model and the dimensions of internal flow restrictions within the tubes were selected to maintain the properly scaled condenser loss relative to other losses, based on the Euler scaling criterion. The model condenser tubes were 24 inches long and 0.347 inch ID with internal restrictions measuring 1.2 inches long and 0.173 inch ID. Each model condenser tube corresponded to about seven prototype condenser tubes.

An additional model of the outlet pipes and outlet culverts was constructed for the purpose of evaluating the amount of mixing in the outlet culverts. This model was fabricated from transparent acrylic plastic to a geometric scale ratio of 1:20.

Three targeted chlorination alternatives, including a rotating injection system, an inlet pipe injection system, and a water box injection system, were tested in the model. In the prototype rotating injection system, chlorinated water is delivered to targeted condenser tubes through an injection header which rotates across the tube sheet face. A neoprene seal is used to minimize leakage from the inlet water box into the targeted tubes.

A seal test apparatus was constructed to determine seal friction and wear, shearing force required for removing tube sheet obstructions, and seal leakage. A portion of the prototype tube sheet was simulated at full scale and a section of seal material (neoprene) was rotated with respect to the simulated tube sheet. A weighted lever arm was used to load the seal material.

Flow rate through the model was measured with a calibrated orifice flowmeter and an air/water differential manometer. Piezometric heads were measured along the condenser model using sets of four piezometer taps connected in the triple-tee arrangement recommended for unbiased averaging. Path lines within the test section were traced with air bubbles, and the bubbles were illuminated and sketched to document flow patterns.

Velocities and turbulence intensities in the outlet water box were measured with a laser velocimeter (LV). The LV system was operated in the dual-beam, backscatter mode using a counter-type signal processor and a microcomputer for data acquisition and analysis. Turbulence intensities were computed from the probability density distribution for the velocity data. For these tests, the laser velocimeter was mounted on the bed of a milling machine, which provided stable, rapid, and accurate positioning of the measuring volume within the test section.

Fluorescent dye was used to simulate the chlorinated injection solution. Samples were withdrawn from the discharge jets of individual model condenser tubes and the dye concentration was measured with a fluorometer. An opaque white dye was also injected through the manifold for flow visualization.

The average friction coefficient between the neoprene seal material and the simulated tube sheet was 0.85 under dry conditions and 0.78 under wet conditions. There was an initial period of relatively high seal wear before the seal "wore in" and the wear rate diminished. Shear test results are summarized in Table I, infra.

TABLE I

| Summary of Shear Test Results | |
|---|---|
| Tube Sheet Contaminant | Shear Forced Required (lbf) |
| Mussel shell | 29 |
| Hickory nut | 100 |
| Wooden stick | 227 |

The leakage flow rates decreased with increased normal loads on the seal specimen and reached asymptotic values which were linearly related to the differential heads across the specimen. The estimated maximum leakage flow rate across the prototype seal, based on a differential head across the seal of 13 feet is 44 gpm.

Loss coefficients were computed from equation 5 using the differential head between inlet pipe (or outlet pipe) and the inlet (or outlet) water box and the velocity in the inlet (or outlet) pipe. Inlet and outlet loss coefficients were plotted as a function of Reynolds number. The result of the model tests have shown that the prototype flow rate can be calculated as a function of differential head between the outlet water box and the outlet pipe by using the following formula:

$$Q_w = 115.85 \sqrt{\Delta h}$$

where:
$Q_w$ = flowrate (ft$^3$/s)
$\Delta h$ = piezometric head differential (ft of water)
$Q_w \times 449 = Q$ (gpm)

Sketches of flow patterns in the inlet and outlet water boxes were made. Flow recirculation zones were noted in both the inlet and outlet water boxes.

Results of testing the 1:20 scale outlet culvert model indicate that the flow is well-mixed both vertically and horizontally within three outlet culvert diameters downstream from the junction where the eastern and western outlet culverts combine. Consequently, complete mixing of the chlorinated water with the circulating water should be achieved before the flow reaches the discharge structure.

The flow patterns in the outlet water box derived from the rotating injection header tests show that relatively little mixing of the chlorinated water occurs in the outlet water box, but substantial mixing occurs in the outlet pipe.

Results from velocity traverses across the outlet tube sheet area affected by the injection header, corresponding to operation of the header at the five test positions, were provided in nondimensional form. The minimum discharge velocity observed for a tube affected by the header was 1.2 ft/s, and the mean discharge velocity for tubes unaffected by the header was 6.8 ft/s. Because the ratio of the condenser tube diameter to the header seal thickness is significantly smaller in the prototype than in the model, additional velocity reduction should be possible in the prototype.

Dye concentration results from sampling traverses in the outlet water box at appropriate locations for the five test positions were obtained. The average dye concentration in the reservoir supplying the rotating injection header was 320 ppb. Dye concentrations measured in the discharge plumes ranged from 41 ppb to 202 ppb, indicating leakage flow past the header seal. The prototype seal leakage is expected to be much smaller due to the relatively smaller tube diameter compared to the seal thickness and the results of the seal leakage tests, as discussed above. The average dye concentration downstream from the outlet water box ranged from 1.0 ppb to 1.5 ppb.

A seal test apparatus and two physical models were designed, constructed, and tested to provide information for designing and demonstrating a prototype targeted chlorination system for unit 7 at TVA's Kingston Steam Plant. The seal test apparatus was used to determine seal friction and wear, shearing force required for removing tube sheet obstructions, and seal leakage. Mixing in the outlet culverts was evaluated qualitatively with a 1:20 scale physical model. A 1:6 scale model of the condenser water boxes was used to evaluate targeted chlorination alternatives and to determine a calibration for prototype flows. Results and conclusions from these tests are summarized below:

(1) The friction between the chloroprene seal material and the simulated tube sheet was 0.85 under dry conditions and 0.78 under wet conditins. Prototype seals should be inspected for wear at 3-month intervals, or more frequently if possible. A shear force of 227 lbf was required to remove a wooden stick obstructing a tube. The estimated maximum leakage flow rate across the prototype seal is 44 gpm.

(2) Complete mixing of the chlorinatdd water from the targeted chlorination system with the circulating water will occur before the flow reaches the discharge structure.

(3) Differential head between the outlet water box and the outlet pipe can be used as an indication of prototype flow rate.

(4) The rotating injection header operates as designed by providing a high chlorine concentration to a small, localized area of the tube sheet and by reducing tube velocities.

While I have shown and described particular embodiments of our invention, modifications and variations thereof will occur to those skilled in the art. I wish it to be understood, therefore, that the appended claims are intended to cover such modifications and variations which are within the true scope and spirit of our invention.

What I claim as new and desire to secure by Letters Patent of the United States is:

1. In a method for removing from the water contact surface side of utility steam condensers biological fouling organisms adhering thereto by contacting said organisms with chlorine-enriched water passed in contact therewith in concentrations sufficiently high to attack said organisms to effect the loosening thereof from the water contact surfaces of said condenser, and to ensure the removal of said loosened organisms by flushing same with said chlorine-enriched water out of contact with said water contact surfaces of said condenser; the improvement in combination therewith for ensuring that the concentration and time of contact between said chlorine enriched water and said organisms are sufficient to attack, dislodge, and flush said organisms from said surfaces and at the same time ensure that the resulting discharged chlorine-enriched water from said condenser water box and discharge pipe meets prescribed Federal regulations relating to and restricting effluent chlorine levels, which improved process comprises the steps of:

(1) maintaining a throughput of cooling water, said cooling water being substantially free of total residual chlorine, through at least a substantial portion of the water contact side of said condenser at rates about equal to or simulating the normal operating flow rates for which said condenser is designed, and thereafter removing same to a collection canal means, or the like, by condenser water box and discharge pipe means;

(2) simultaneously contacting relatively small and predetermined amounts of the total water contact surface side of said steam condenser with chlorine-enriched water, said relatively small and predetermined amounts of total water contact surface area ranging from about 2 percent to about 3 percent of the total condenser water contact surface area, the chlorine enrichment of said water ranging from about 5 to about 100 ppm free chlorine;

(3) maintaining said chlorine-enriched water in contact with said relatively small and predetermined amounts of surface area for an accumulated period of time ranging from about 2 to about 5 minutes while maintaining the flow rate of chlorine-enriched water therethrough at flow rates equal to about 10 percent to about 50 percent of the flow rate utilized in the remaining portion of the water contact side of said condenser;

(4) redirecting at least a portion of the stream of unchlorinated cooling water and at least a portion of the stream of said chlorine-enriched water so as to bring into contact with said chlorine-enriched water portions of the water contact surfaces of said condenser which had not been previously exposed thereto until substantially all of said water contact surfaces of said condenser have been contacted with said chlorine-enriched water at the reduced flow rates and for the period of time recited in step 3, supra; and (5) thereafter mixing said streams of chlorine-free cooling water and chlorine-enriched water in the water box and discharge pipe means from said condenser prior to its introduction into said discharge canal means;

said improved process characterized by the fact that although all of the water contact surfaces of said condenser are exposed to chlorine-enriched water of concentrations up to about 100 ppm for times sufficient to ensure the destruction, dislodging, and flushing of the fouling biological film thereon, the total residual chlorine in the cooling water discharged to said discharge canal does not exceed about 0.2 ppm.

2. The method of claim 1 wherein the chlorine-enrichment of said water ranges from about 10 ppm to about 25 ppm free chlorine.

3. The method of claim 1 wherein the chlorine-enrichment of said water is about 20 ppm free chlorine.

4. The process of claim 2 wherein said relatively small and predetermined amounts of total water contact surface area in contact with said chlorine-enriched water is about 2.5 percent of the total water contact surface area of said condenser.

5. The process of claim 3 wherein the accumulated period of time for contact of said chlorine-enriched water with said surface area is about 3 minutes.

* * * * *